United States Patent [19]

McCulloch et al.

[11] Patent Number: 5,964,865

[45] Date of Patent: Oct. 12, 1999

[54] OBJECT CODE ALLOCATION IN MULTIPLE PROCESSOR SYSTEMS

[75] Inventors: Christopher Michael McCulloch, Chipping Norton; Peter Charles Eastty, Oxford; William Edmund Cranstoun Kentish, Chipping Norton, all of United Kingdom

[73] Assignees: Sony Corporation, Tokyo, Japan; Sony United Kingdom Limited, Weybridge, United Kingdom

[21] Appl. No.: 09/107,862

[22] Filed: Jun. 30, 1998

Related U.S. Application Data

[62] Division of application No. 08/611,081, Mar. 5, 1996.

[30] Foreign Application Priority Data

Mar. 30, 1995 [GB] United Kingdom ............... 9506590

[51] Int. Cl.$^6$ ..................................................... G06F 15/80
[52] U.S. Cl. .............................................. 712/35; 712/24
[58] Field of Search ............................... 712/24, 35, 200, 712/215

[56] References Cited

U.S. PATENT DOCUMENTS 5,053,986 10/1991 Ashan ..................................... 364/736
5,732,234 3/1998 Vassiliadis .............................. 395/376

*Primary Examiner*—Eric Coleman
*Attorney, Agent, or Firm*—Frommer Lawrence & Haug, LLP.; William S. Frommer

[57] ABSTRACT

This invention relates to the allocation of object code in multi-processor systems. In particular, techniques are disclosed for efficiently allocating signal processing instructions to a large array of parallel signal processing units.

2 Claims, 9 Drawing Sheets

OBJECT CODE ALLOCATION IN MULTIPLE PROCESSOR SYSTEMS

This is a divisional of application Ser. No. 08/611,081, filed Mar. 5, 1996.

BACKGROUND OF THE INVENTION

1. Field of the Invention

This invention relates to the allocation of object code in multi-processor systems.

2. Description of the Prior Art

In data processing systems using an array of parallel interconnected data processing devices or processing units, it is necessary to allocate processing tasks between the different processing units. The efficiency with which this is done (often at the end of a compilation stage) can determine the usefulness and operational efficiency of the processing array.

An example of such a multiple parallel data processing apparatus is a digital audio processing apparatus such as an audio mixing console. In a previously proposed mixing console, a respective dedicated processing unit is allocated to each of a number of audio channels to be processed. However, this can lead to inefficient use of the array of processing units since the processing requirements of the various audio channels may be quite different.

SUMMARY OF THE INVENTION

This invention provides digital audio processing apparatus comprising a plurality of parallel processing units for performing processing operations on a plurality of audio channels, in which, for at leas a subset of the audio channels, the processing requirements associated with each channel in the subset are successively performed by more than one processing unit, and at least one of the processing units performs respective processing operations associated with more than one of the audio channels.

Preferably each processing unit executes a respective predetermined repetitive sequence of data processing instructions, the sequence being executed once during each audio sample period of audio data in the audio channels. It is also preferred that the sequence of instructions for each processing unit does not include conditional branch instructions. With these measures, because the program run by each processing unit during each audio sample period is identical to that run during any other audio sample period, the system can be set up so that no bus arbitration is needed for communication between the processors. The bus transfers can be decided in advance, with each of the horizontal and vertical buses being allocated to a pair (a sender and a receiver) of processing units at each occasion when a bus transfer is possible. Processing units which are not intended to use the bus at a particular time can simply have their bus connections tri-stated at that time.

This invention also provides a method of object code generation for a multiple processor data processing apparatus having an array of interconnected processing units, the method comprising the steps of:

(i) generating initial program code comprising successive data processing instructions;
(ii) dividing the initial program code into a plurality of groups of instructions, the number of groups being greater than the number of processing units in the array of processing units;
(iii) detecting the data transfer requirements between pairs of groups of instructions;
(iv) ranking the pairs of groups in decreasing order of the detected data transfer requirements; and
(v) joining pairs of groups in the ranking order to form joined groups if the size of each joined group does not exceed a maximum number of instructions executable by each processing unit and so that the joined groups give the greatest reduction in the total data transfer requirement of all of the groups.

In case the above method results in a number of joined groups which is greater than the available number of processing units, it is preferred that the method comprises the further steps of:

(vi) detecting whether the number of joined groups is greater than the number of available processing units, and, if so:
(vi) ranking the joined groups in order of the number of instructions in each joined group; and
(vii) joining groups having the highest numbers of instructions with groups having the lowest numbers of instructions to reduce the number of groups to be equal to or less than the number of available processing units.

This invention also provides a method of object code generation comprising the steps of:

generating initial program code comprising successive data processing instructions;
detecting groups of logically adjacent instructions within the initial program code which can be replaced by single instructions; and
replacing each detected group of instructions by a respective single instruction.

In one preferred embodiment, each instruction of a detected group of instructions is a binary shift instruction; and the respective single instruction for that group of instructions is a bit shift instruction. In another possible embodiment, a detected group of instructions comprises a multiplication instruction logically adjacent to an addition instruction; and the respective single instruction for that group of instructions comprises a multiply-add instruction.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
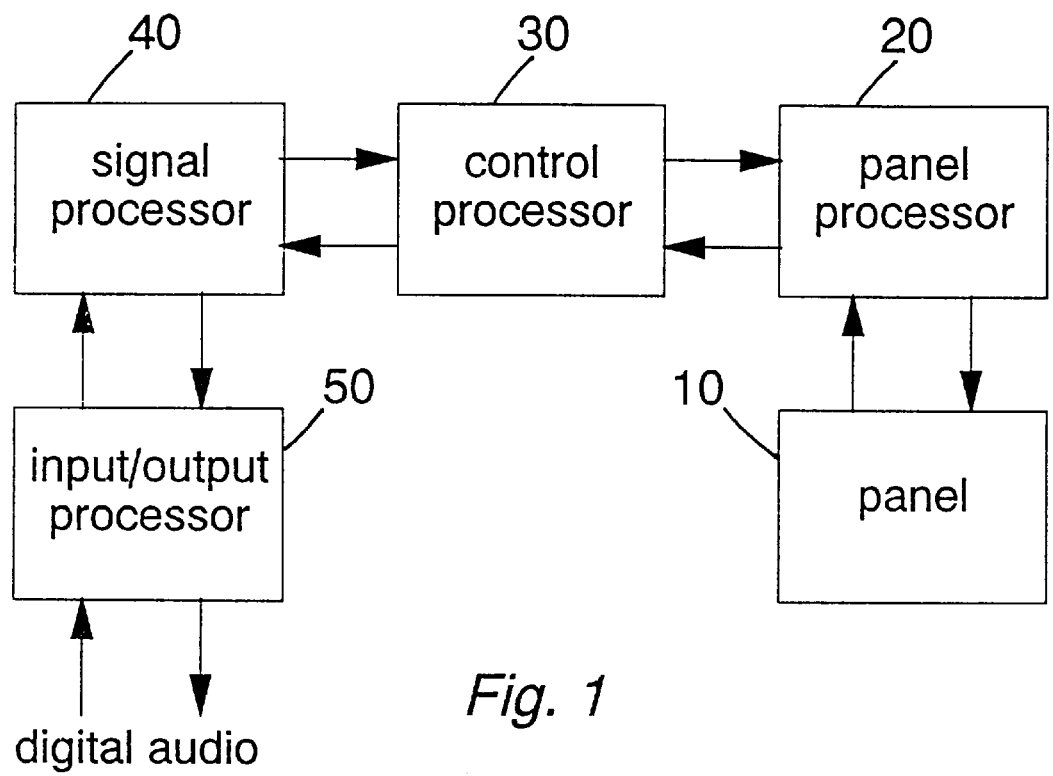
FIG. 1 is a schematic diagram of a digital audio mixing console.

FIG. 1 is a schematic diagram of a digital audio mixing console.

In FIG. 1, the user operates controls on a control panel or desk 10. The controls may be switches, faders, potentiometers and the like. The panel also provides displays of, for example, signal levels, signal routing, equaliser operation and the like. The exchange of information with the panel controls and display devices is handled by a panel processor 20.

The panel processor 20 is in turn connected to a control processor 30 which receives information from the panel processor indicative of control positions set by the user on the panel, and uses that information to control the operation of a signal processor 40.

The signal processor 40 receives digital audio data from an input/output processor 50, processes that audio data under the control of the control processor 30 and supplies processed digital audio data to the input/output processor 50 for output.

The signal processor 40 is in fact embodied as a signal processing array, to be described below with reference to FIGS. 3, 4 and 5.

In a large mixing console, possibly handling 64 to 128 channels, a great deal of signal processing needs to be applied to mix, equalise and adjust the combinations made of the various audio channels. For simplicity, only a very small part of that processing is illustrated schematically in FIG. 2, in order to show various principles involved.

Figure 2:
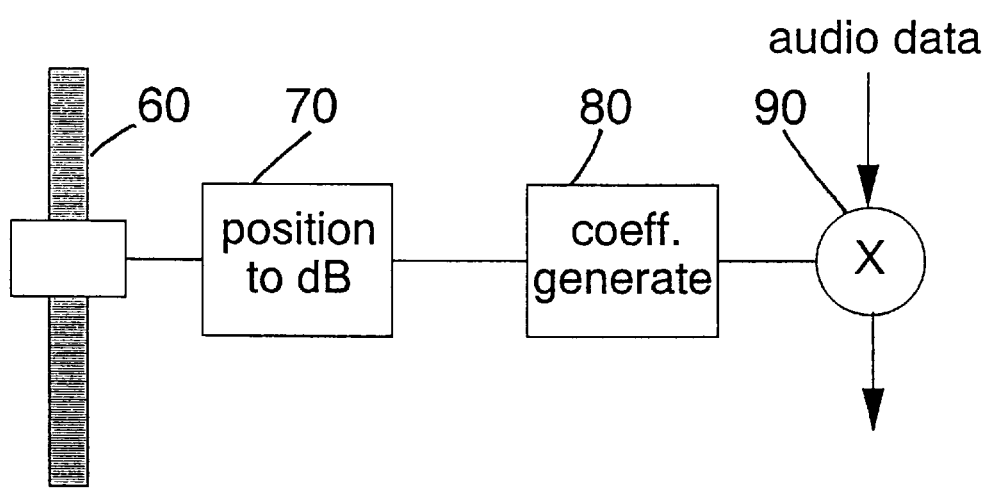
FIG. 2 is a schematic diagram of a small part of the channel processing applied to one audio channel in the console of FIG. 1.

Referring to FIG. 2, a small part of the channel processing for one audio channel of the console comprises a fader (linear potentiometer) 60, a position conversion unit 70 which converts the position of the fader into a control quantity (such as decibels of gain) for processing the audio data of that channel, a coefficient generator 80 and a multiplier 90.

In operation, a user can specify the gain to be applied to an input audio signal by moving the fader 60. The physical position of the fader is digitised and passed to the position converter 70. The position converter 70 maps the digitised position of the fader 60 onto a corresponding gain value in decibels, to be passed to the coefficient generator 80 which converts that required gain into a multiplication coefficient. The input audio data is then multiplied by that multiplication coefficient or factor in the multiplier 90.

Comparing FIGS. 1 and 2, the fader 60 forms part of the panel 10, with the panel processor 20 sampling the digitised position of the fader. The position converter 70 is provided by the control processor, and the coefficient generator 80 is embodied by the control processor 30 and the signal processor 40. Finally, the only part of FIG. 3 which is actually part of the signal path, the multiplier 90, is provided by the signal processor 40.

As mentioned above, the signal processor 40 is in fact embodied as a signal processing array comprising a number of processing units. (The control processor 30 may similarly be embodied as an array of control processing units. However, in this embodiment, the control processor 30 is provided by a single microprocessor device.)

Figure 3:
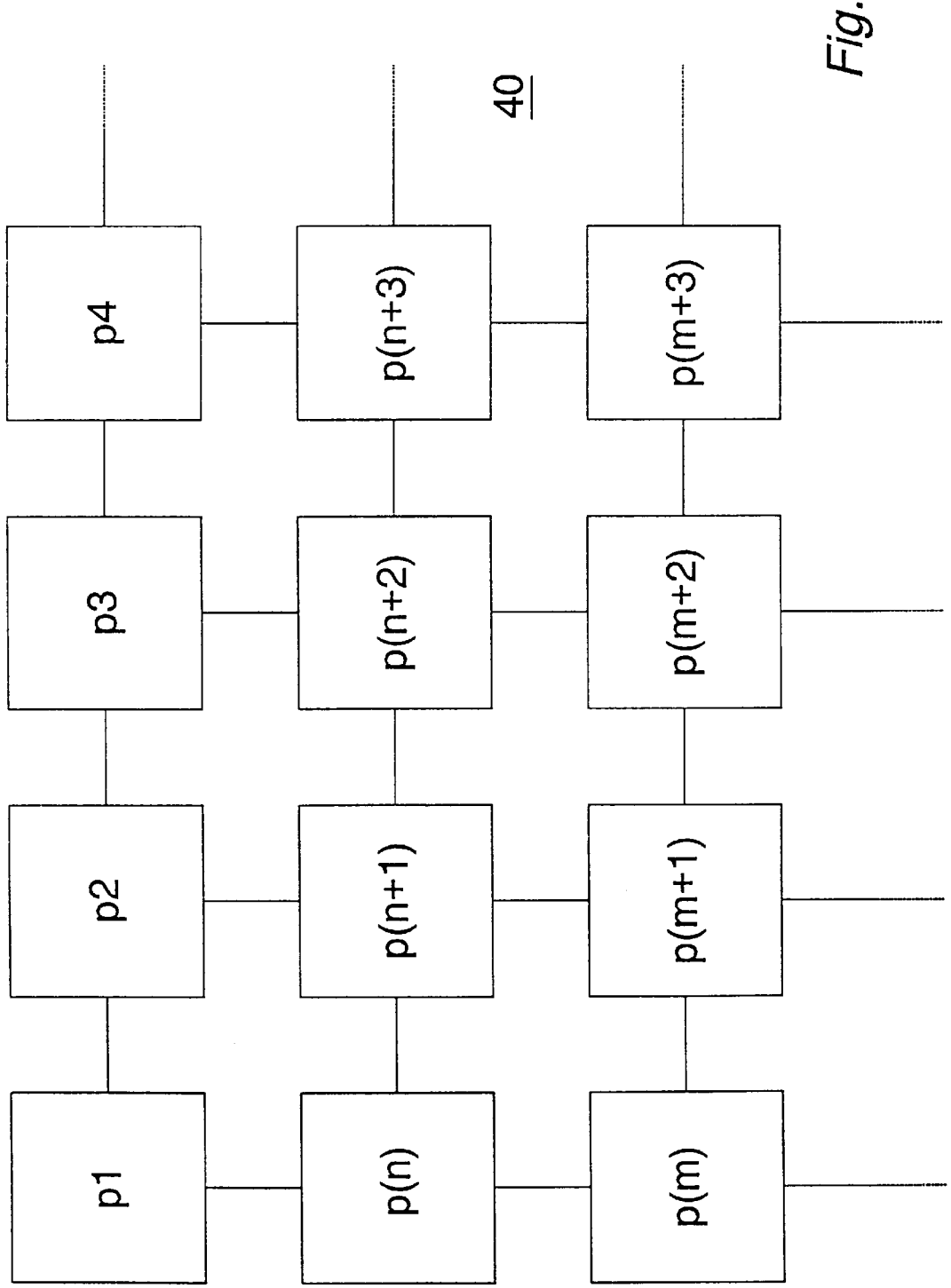
FIG. 3 is a schematic diagram of a signal processing array forming part of the console of FIG. 1.

FIG. 3 is a schematic diagram of a signal processing array forming the signal processor 40. The individual processing units forming the array are numbered p1, p2, p3, ... p(n), ... p(m) and so on. They are arranged (at least electrically) in a square or rectangular array of processing units. For example, in an array of 25 processing units, the electrical arrangement could be a square array of 5×5 processing units in the horizontal and vertical directions respectively. Two or more such arrays could be linked together by buses.

The array of processing units is interconnected by horizontal and vertical communication buses. In FIG. 3, the processing units p1, p2, p3, p4, ... are interconnected by a horizontal bus, and the processing units p1, p(n), p(m), ... are connected by a vertical bus.

The horizontal and vertical buses are arranged so that any device connected to a particular bus may communicate with any other device connected to that bus. The processing units run a repetitive program, repeating once in each audio sample period (about 23 microseconds for a 44.1 kHz sampling rate). No conditional branch instructions are used, which means that the processing operations carried out each time the program is repeated are identical (naturally, the data on which the processing operations are performed will vary from sample period to sample period).

Because the program run by each processing unit during each audio sample period is identical to that run during any other audio sample period, the system can be set up so that no bus arbitration is needed. The bus transfer can be decided in advance, with each of the horizontal and vertical buses being allocated to a pair (a sender and a receiver) of processing units at each occasion when a bus transfer is possible. Processing units which are not intended to use the bus at a particular time can simply have their bus connections tri-stated at that time.

The program run by each processing unit during each audio sample period occupies a predetermined number of clock cycles, which in this embodiment is 512 clock cycles, giving a processor clock speed of about 23 MHz for a 44.1 kHz sample rate. Bus transfers are allowed to take place at each clock cycle.

Figure 4:
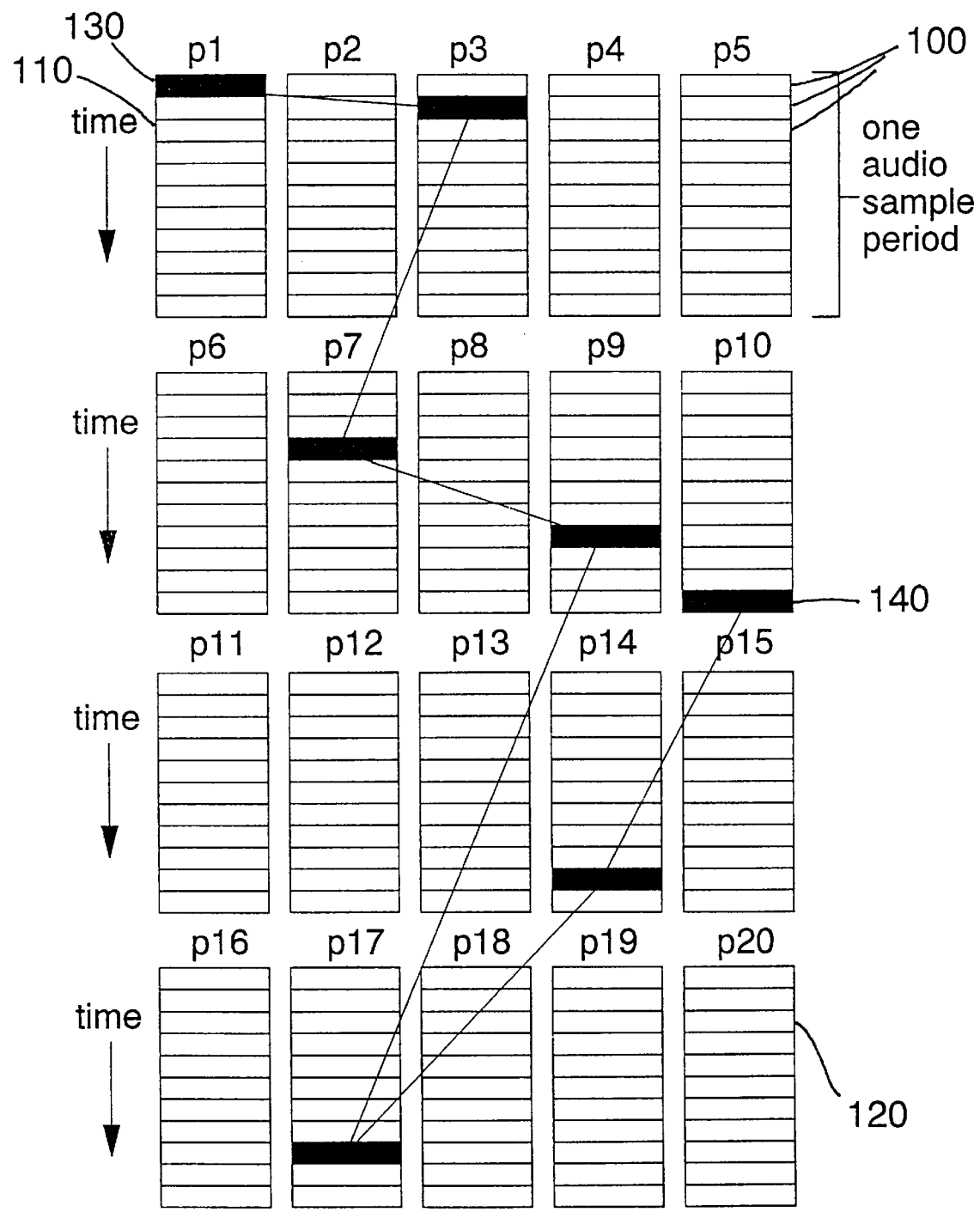
FIG. 4 is a schematic diagram illustrating the operation of the processing array of FIG. 3.

FIG. 4 is a schematic diagram illustrating the operation of the processing array of FIG. 3. FIG. 4 shows only 20 processing units (p1 to p20) for clarity of the diagram, although (as stated above) many more units could be used in practice.

Because the processing units are linked in the bus network shown in FIG. 3, the processing requirements of a particular task can be split between the processing units. In fact, neither audio channels nor particular processing operations (such as the operation of an equalising stage) are tied to particular processing units.

FIG. 4 shows the operation of the 20 processing units during a particular audio sample period. The figure shows 11 instructions 100 being carried out by the processing units during that audio sample period, indicated by divisions on a vertical axis in FIG. 4. The instructions are performed concurrently, so that, say, the third instruction indicated for processing unit p1 (an instruction 110) is carried out at the same time as the third instruction indicated for each of the processing units p2 to p20 (for example, the instruction 120).

An example of the way in which a processing task can be split between the processing units is shown in FIG. 4 by shading the instructions use to carry out that task. In this example, the initial processing required for the processing task is carried out by an instruction 130 in the processing unit p1. Processing is then transferred via the bus network to the processing units p3, p7, p9, p17, p14 and p10 in that order, terminating at an instruction 140 on the processing unit p10. The many other processing tasks required are similarly interleaved between all of the processing units in the array.

Figure 5:
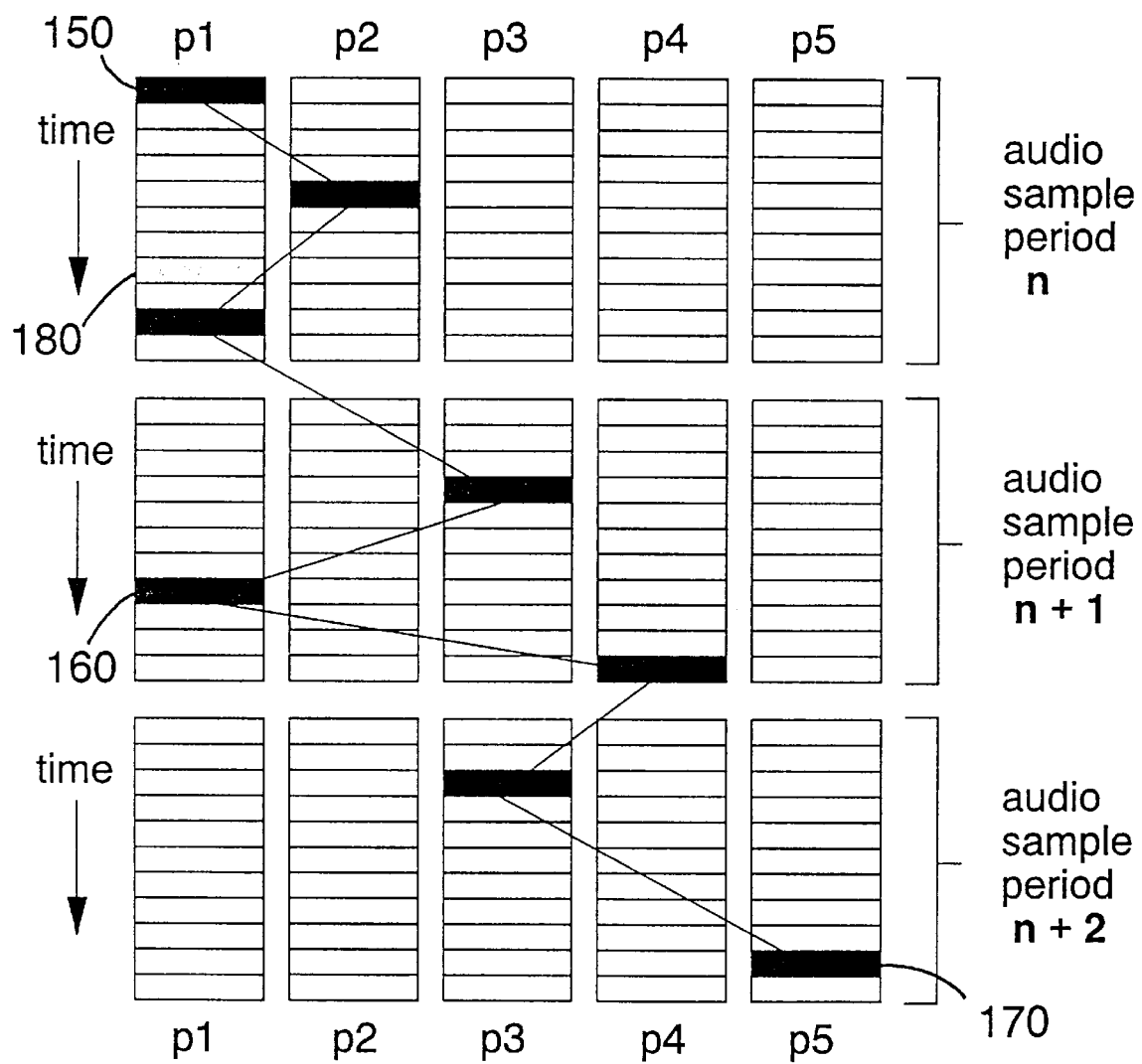
FIG. 5 is a further schematic diagram illustrating the operation of the processing array of FIG. 3.

FIG. 5 is a further schematic diagram illustrating the operation of the processing array of FIG. 3. FIG. 5 shows how the instructions required for a particular processing task can be split between audio sample periods as well as being split between processing units.

FIG. 5 illustrates five of the processing units p1 to p5, with the operation of those five processing units being shown for three successive audio sample periods, numbered sample periods n, n+1 and n+2.

In the examples shown in FIG. 5, processing starts at an instruction 150 carried out by the processing unit p1. The task is continued by p2, then p1 again, and is then passed to the processing unit p3 for execution during the audio sample period n+1. From 'the task is passed to an instruction 160 in the processing unit p1 and then to the final instruction in the audio sample period n+1 on the processing unit p4. Finally, the task is continued by an instruction on the processing unit p3 during the third audio sample period (n+2) and terminates with an instruction 170 carried out by the processing unit p5 towards the end of the sample period n+2.

It will be noted that the chain of instructions shown in FIG. 5 does not re-use any instruction positions within each audio sample period. In fact, similar processing chains delayed or advanced by one or more audio sample periods will be interleaved with the chain illustrated in FIG. 5. This means that, for example, the instruction 180 in the processing unit p1 in the audio sample period n is identical to the instruction 160 in the same processing unit in the sample period n+1, but of course operates on audio data which is one sample earlier than the data processed by the instruction 160.

In other words, the allocation of tasks between processing units is particularly efficient by virtue of the feature that, for at least a subset of the audio channels, the processing requirements associated with each channel in the subset are successively performed by more than one processing unit, and at least one of the processing units performs respective processing operations associated with more than one of the audio channels.

Accordingly, the preparation of object code for the processing units requires instructions to be allocated between the processing units, clock cycles and audio sample periods. It is also necessary to allocate bus communication and memory resources between the processing units.

Figure 6:
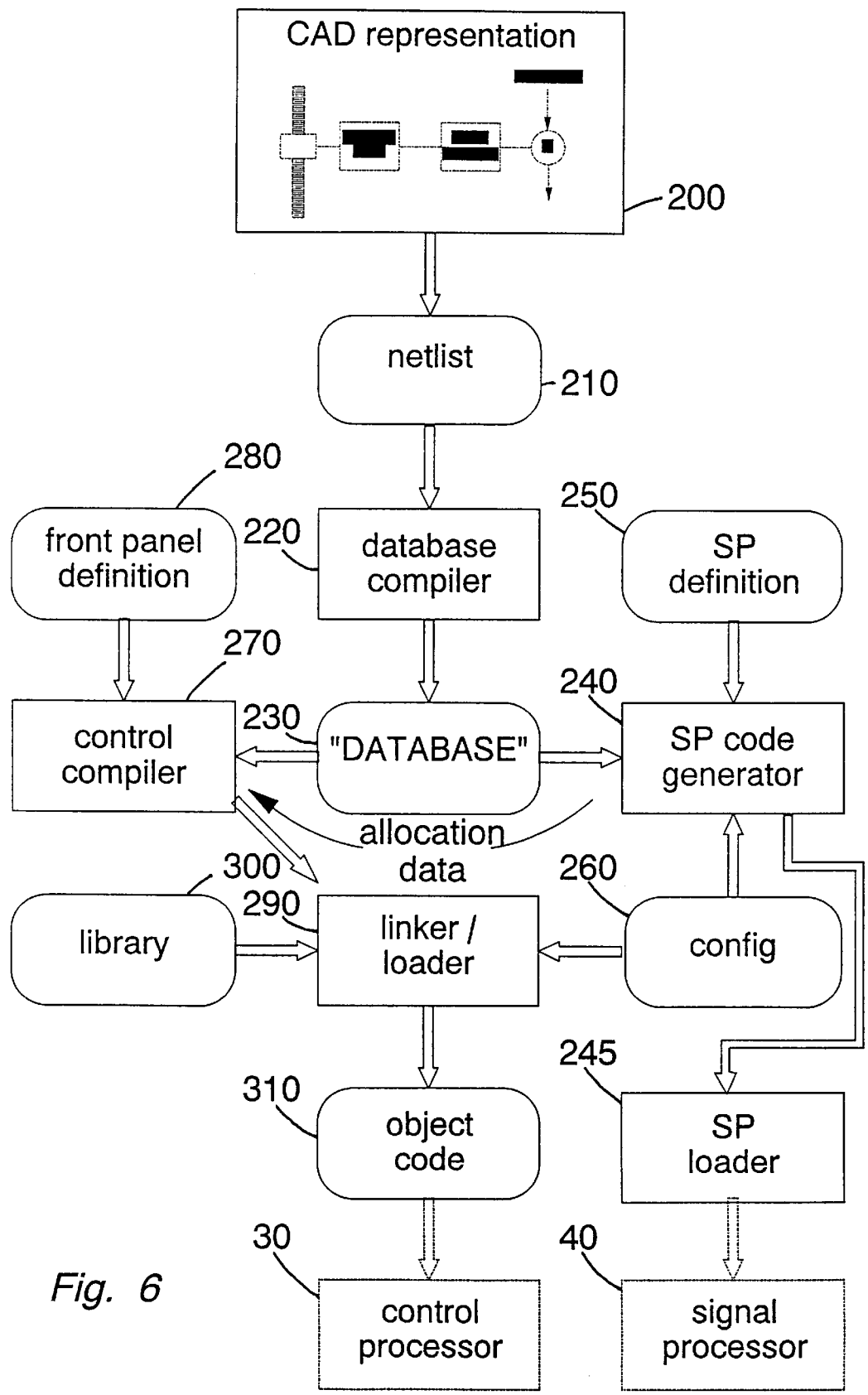
FIG. 6 is a schematic flow chart illustrating the preparation of object code for the console of FIG. 1.

FIG. 6 is a schematic flow chart illustrating the preparation of object code for all of the programmable processing devices in the console of FIG. 1 (i.e. the panel processor 20, the console processor 30, the signal processor 40 and the input/output processor 50). These process steps are performed by general purpose or dedicated data processing apparatus.

The basic technique for generating suitable object code is described in the following references:

1. "An automated approach to digital console design", W Kentish & C Bell, 81st Audio Engineering Society (AES) Convention preprint, 1986;
2. "Digital audio processing on a grand scale", P Eastty, 81st AES Convention preprint, 1986; and
3. "Automatic generation of microcode for a digital audio signal processor", C McCulloch, 81st AES Convention preprint, 1986.

To summarise the technique described in the above references, a schematic circuit diagram similar in form to that shown in FIG. 2 (but generally of much greater size and complexity) is set up on a computer-aided-design (CAD) system. A netlist is generated from the CAD representation and is then complied to produce the object code for running on the various processors of the console of FIG. 1.

Accordingly, FIG. 6 starts with a CAD representation 200 of the signal and control processing of the console of FIG. 1. As described above, part of the CAD representation (such as faders, position converters and coefficient generators) will relate to tasks carried out by the control processor 30, while other parts of the CAD representation 200 will relate to tasks carried out by the signal processing array 40.

A netlist 210 is produced from the CAD representation, which is basically a direct translation of the CAD representation into linked mathematical or data processing instructions. An example of a small part of a netlist will be described below. A database compiler 220 processes the netlist to produce a "database" 230 which is a data file representing the entire processing structure (in terms of elementary data processing instructions) with any hierarchical structure present in the netlist being bypassed (to provide a "flat" representation of the processing structure) for code generation purposes. However, the hierarchical structure is retained for error message routing and debugging purposes.

The database 230 is accessed by a signal processor (SP) code generator 240 which, using data 250 defining the processing characteristics of the processing unit of the signal processing array and data 260 defining the configuration of the processing units, produces object code (in groups of instructions appropriate to the processing capacity of the individual processing units), which is then loaded into the signal processor 40 by an SP loader 245. The SP code generator 240 allocates operations between different processing units, different clock cycles, different sample periods and different bus transfer periods. This part of its operation will be described in more detail below.

A control compiler 270 receives front panel data 280 indicative of the configuration of the panel 10 of the mixing console, along with allocation data from the SP code generator 240 indicative of the allocation of tasks to each processing unit, and generates code to be run by the control processor 30, the panel processor 20 and the input/output processor 50. This code is routed to a linker/loader 290, which receives the output of the control compiler 270. The linker/loader is conventional in operation and receives library program and data files 300 and generates object code 310 to be supplied to the control processor (and the panel and input/output processors) of the console of FIG. 1.

The allocation of compiled instructions between the different processing units will now be described with reference to FIG. 7, which is a more detailed schematic flow chart illustrating the preparation and allocation of object code for the processing array of FIG. 3, as performed by the SP code generator 240.

Figure 7:
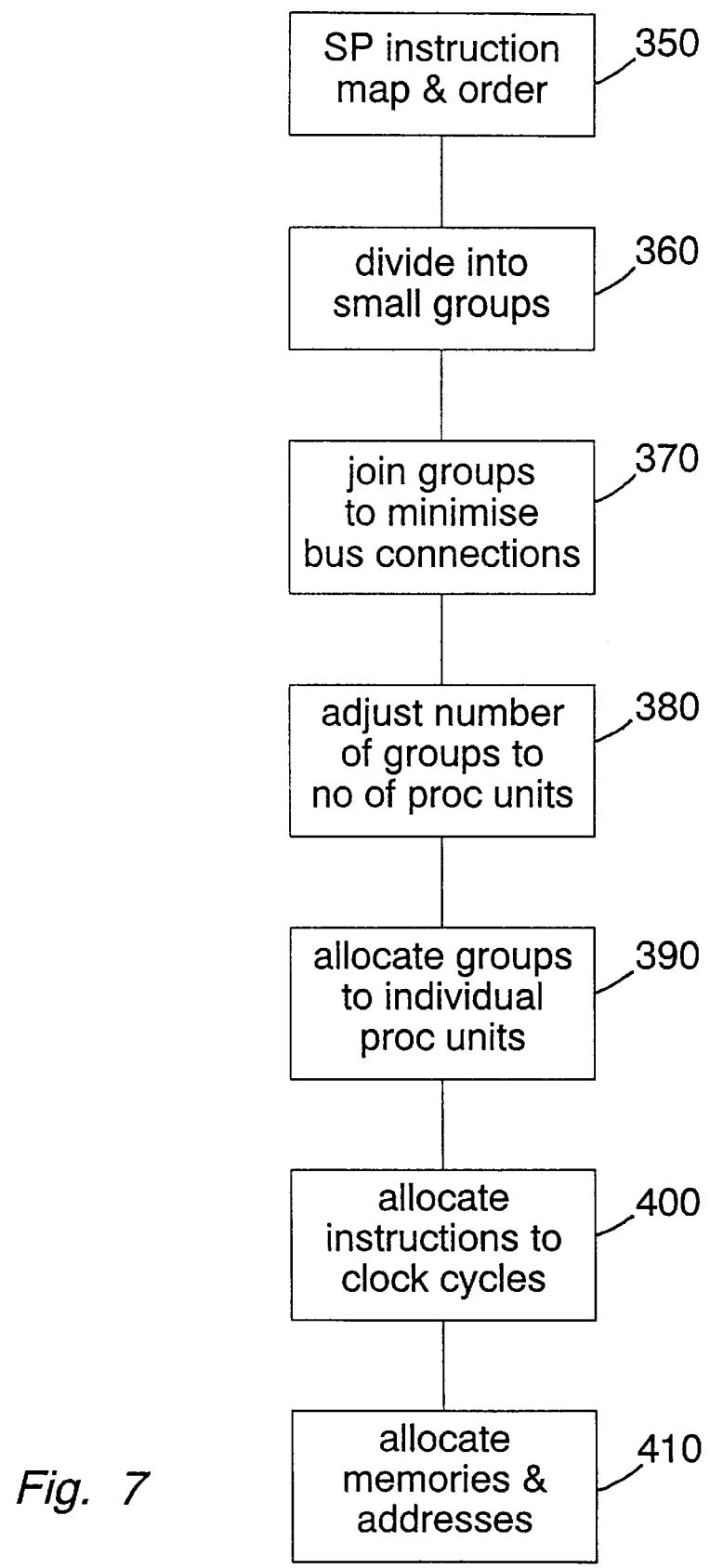
FIG. 7 is a more detailed schematic flow chart illustrating the preparation and allocation of object code for the processing array of FIG. 3.

Referring to FIG. 7, at a step 350 the initial code is examined to remove surplus instructions. This instruction mapping and ordering technique involves searching for logically adjacent instructions which can then be translated (with a simple predetermined mapping table) into single composite instructions giving the same result. This technique is described further below with reference to FIGS. 8 and 9. Also at this stage, a search is made for instructions which require a delayed version of a variable generated by another instruction. The way in which this type of instruction is handled will be described below with reference to FIGS. 10 and 11.

At a step 360, the instructions forming the netlist are divided into small arbitrary groups, such as the small group described below with reference to FIG. 9.

At a step 370 the groups are coalesced into larger groups with the aim of producing groups of instructions which can be accommodated on a single processing unit, subject to the joined group not exceeding the maximum size (e.g. 512 instructions) appropriate to a single processing unit.

In order to do this, the groups are tested in all possible permutations of pairs of groups to assess the bus traffic requirements between each possible pair. The pairs of groups are then ranked in order of decreasing bus traffic requirements. Starting from the top of this ranked list, the first pair of groups (i.e. that one of the possible permutations of pairs which has the highest bus traffic requirement between the pair) is joined. Passing down the list, each pair is then joined, unless either it is detected that they are already indirectly joined by two or more earlier joins of other groups or the join would result in a group of a size greater than the available size of one processing unit.

For example, in a very simple exemplary system having five groups, A, B, C, D and E, the groups are considered in all possible permutations of pairs of groups, and the pairs ranked in order of bus traffic requirements. This might result in the following ranking of pairs:

AD (highest bus traffic requirement)
DE
AE
BD
AB
BE
AC
BC
CD
DE (lowest bus traffic requirement)

Passing down this list, a number of group pairs are joined, always subject to the constraint that the resulting joined group must not exceed the available size of a processing unit. Assuming this test to be initially satisfied, the groups A and D are first joined, as this pair has the highest bus traffic requirement between the two groups. Groups D and E (the second pair) are then joined, but when the third pair (A and E) is examined, it is found that A, D and E are already joined by virtue of the two previous joining steps. Accordingly no action is necessary for the third pair.

This process continues down the list of pairs of groups (which may be many hundreds of pairs of practice).

A joined group is similar in form to an individual group, except hat it is larger. For example, the group of FIG. 9 could be joined to another similar group to generate a larger, but similar, group of logically interconnected instructions.

The assessment of bus traffic requirements is described simply as follows. For example, if a first group required, say, three input variables a, b and c, and generated three output variables d, e and f, all of a . . . f would require transmission on one or more of the buses. However, if that group could be paired with another group which generated variable b and required variable c, by placing the two groups together as a notional pair of groups there would no longer be any need to transmit variables b and c over the bus network, so that bus traffic requirements of the pair would be two input variables and two output variables communicated on the buses.

At the end of the step 370, the number of groups has been reduced dramatically, but may still be higher than the number of available processing units. Accordingly, at a step 380 a final adjustment is made to produce the required number of groups, by firstly ranking the groups output by the step 370 in order of decreasing group size, and then arbitrarily joining the smallest groups to the largest group until that group reaches the number of instructions which can be handled by one processing unit, and then continuing by combining the second largest group with the next remaining smallest group, and so on. This results in a number of groups which is equal to or fewer than the number of available processing units.

If the smallest of the groups added to the largest of the groups results in a joined group which exceeds the available number of instructions on a single processing unit, the smallest group is split at the position of an original join (made in the step 370), with the particular join to be split being selected to give an appropriately sized portion of the split group to add to the other (largest) group to approach the processing capacity of one processing unit as closely as possible.

It is then necessary to allocate each group of instructions to a respective processing unit. This is done at a step 390 by detecting the group (of those generated by the step 380) having the largest total required bus traffic, and allocating that group to an arbitrary position on an imaginary infinite array of processing units.

The group having the second highest bus traffic requirement is then allocated to an adjacent processing unit, assuming that it requires communication with the first group; if not, it is placed on a separate imaginary array.

Continuing the step 390, the group having the third highest bus traffic requirement is then tested in the following positions on the imaginary array(s) of processing units:

along the same bus as that connecting the first two groups, assuming that the first two groups communicated with one another and at least one of the first two groups communicates with the third group);

along a perpendicular bus connected to the first of the two groups already allocated (assuming that group communicates with the third group); and along a perpendicular bus connected to the second of the two groups already allocated (assuming that group communicates with the third group).

If the third group does not communicate with either of the first two groups, it is placed on a third imaginary array of processing units. As a number of imaginary arrays builds up, these can be coalesced whenever a common link is found between them (i.e. a group which communicates with groups on each of two or more of the imaginary arrays).

In each test position, the total bus traffic is assessed, and the position is selected which gives the most favourable reduction in bus traffic.

This process continues for the remaining groups, testing each one in turn at all of the available different positions on the imaginary array of processing units, considering the groups already in the array with which that group needs to communicate. At the end of that process, the groups will be allocated to a corresponding number of processing unit positions, in clusters of intercommunicating groups. These clusters are then positioned adjacent one another. At this stage, the groups may not be arranged on the imaginary array(s) in the same configuration as the physical hardware on which the code has to be run. Accordingly, the array is then aligned to allocate the highest number of groups in the imaginary array to corresponding real processing units. Any groups in the imaginary array which "fall off" the real array of processing units (i.e. have positions on the imaginary array(s) not corresponding to real processing units) are gradually moved in order of bus traffic requirements to available positions within the real array of processing units (a square array in the example processing array described above) until the groups can all be assigned to a respective processing unit in the real array. The position of each of these relocated groups is selected (for each group in turn) as the position (of the possible available positions) which gives the lowest maximum traffic on any bus.

At a step 400, the instructions within each processing unit are allocated to clock cycles executed by that processing unit.

This is basically done by linking the instructions into chains of dependencies on other instructions. For example, if a variable a is derived from two other variables b and c, the instruction which generates variable a must be carried out after the instructions which generate variables b and c. In practice, if pipelined processors are used, the instruction to generate variable a must be carried out, say, six instructions after the later of variables b and c is generated, if a six-instruction pipeline is used.

The other limit on the time at which the instruction to generate variable a can be performed is that one sample period after the generation of the earlier of the variables b and c, that variable is likely to be overwritten by a new value (since the processing instructions repeat once every sample period as described above). It is possible to store the previous value of the variable b or c in a memory location for use more than one sample period after is was generated, but this is better avoided as it is wasteful of resources.

Finally, at a step 410, memories and memory addresses are allocated to variables which need to be stored or passed from one sample period to another.

Figure 8:
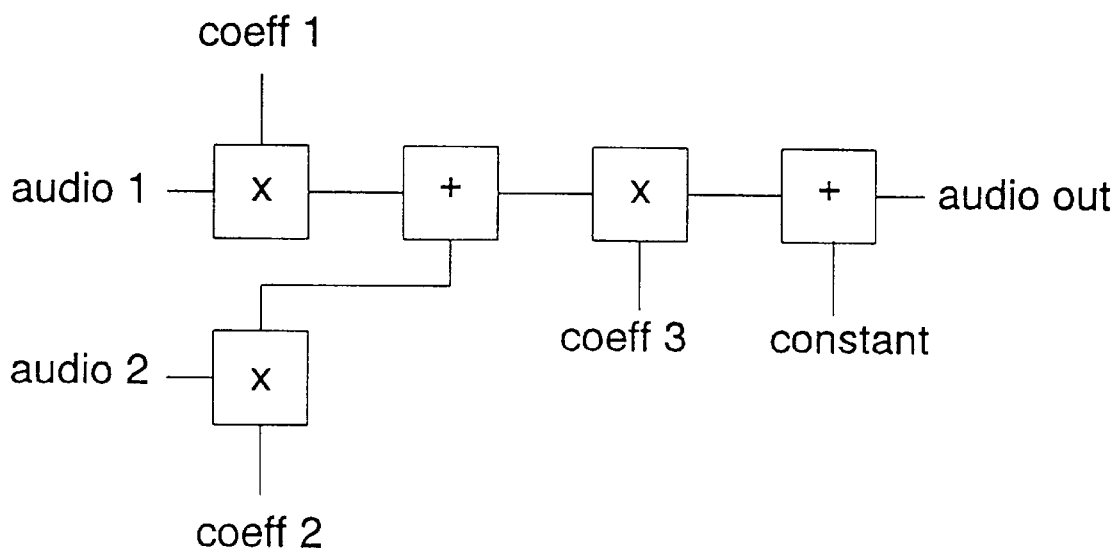
FIG. 8 is a schematic diagram of a portion of a database.

FIG. 8 is a schematic diagram of a small portion of a database 210 generated from the CAD representation 200.

The database comprises a linked list of low level (elementary) data processing or mathematical instructions, which in the example shown in FIG. 8 are multiplication and addition instructions. In particular, a first audio signal (Audio 1) is multiplied by a coefficient (Coeff 1) and added to the product of a second audio signal (Audio 2) and another coefficient (Coeff 2). The sum of these two products is then multiplied by a further coefficient (Coeff 3) and finally added to a constant value to generate an audio output signal.

In the instruction mapping and ordering step (step 350 of FIG. 7) described above, the number of instructions in the database is reduced in various ways:

a) where two or more logically adjacent instructions can be replaced by a single instruction of the same type, this replacement is carried out. For example, two logically adjacent bit shift instructions can be replaced by a single shift instruction which shifts by the sum of the amounts referred to in a separate instructions.

b) where two or more logically adjacent instructions can be replaced by a single different instruction, this replacement is also carried out. For example, if (as in the present embodiment) the processing units are capable of performing "multiply-add" instruction in a single clock cycle, logically adjacent multiply and add instructions can be combined into a single multiply-add instruction. Bit shift instructions can be incorporated into a further composite multiply-add-shift instruction.

Figure 9:
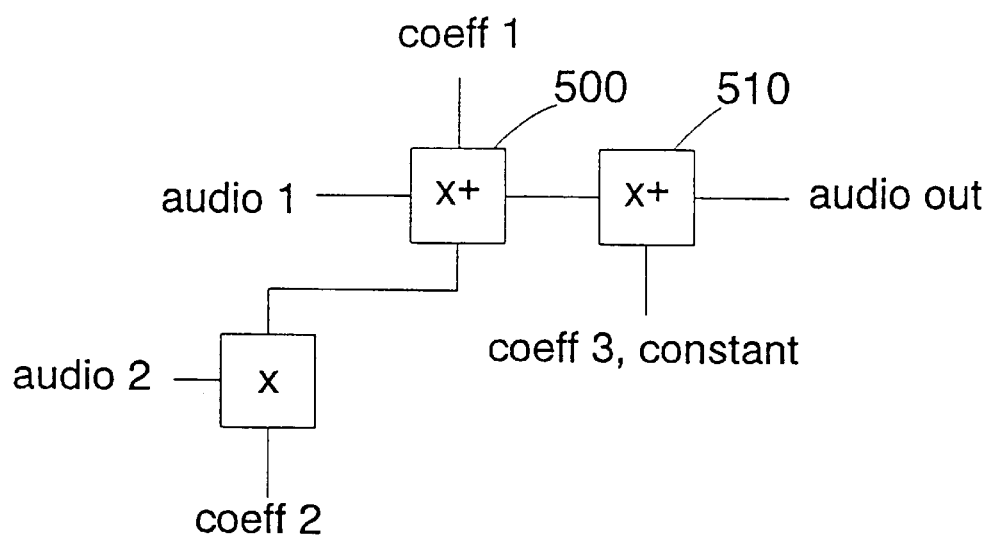
FIG. 9 is a schematic diagram of a portion of a database after an instruction reduction process.

This reduction process is illustrated in FIG. 9, which shows the portion of FIG. 8 after instruction reduction. The consecutive multiplication and addition operations carried out on the first audio signal (Audio 1) have been combined into a single multiply-add instruction 500. Similarly, the multiplication by Coeff 3 and the addition of the constant value have been combined into a single multiply/add instruction 510.

Figure 10:
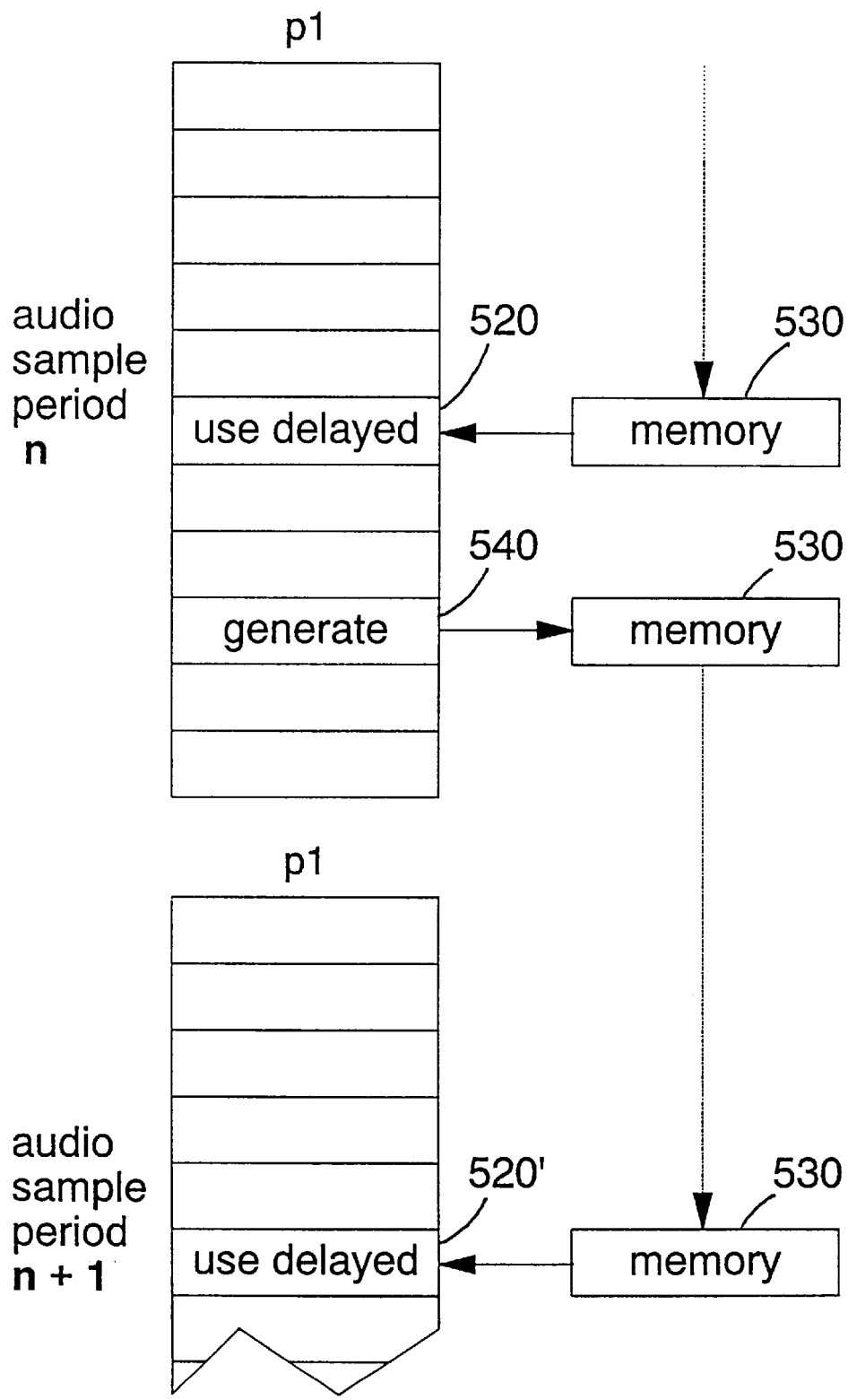
FIG. 10 is a schematic diagram illustrating the way in which embodiments of the invention handle signal processing using delayed versions of a variable.

FIG. 10 is a schematic diagram illustrating the way in which the present embodiment handles the use of delayed versions of a variable.

This technique applies where a particular variable is generated and stored and then, later in the signal processing chain, an operation is performed on a previous value of that variable.

In the present embodiment, a search is made during the step 350 of FIG. 7 for this type of situation. Where this occurs, the execution order of the two operations described above (namely the generation of the variable and the subsequent use of the delayed value of the variable) is reversed, so that the operation requiring the delayed variable is actually performed before the operation to generate that variable. This means that on each occasion, the previously-generated version of the variable is used.

This technique is shown schematically in FIG. 10, which illustrates the processing carried out by processing unit p1 during an audio sample period n and part of a following audio sample period n+1.

At an instruction 520, a previous value of the required variable is read from a temporary memory store 530. The new value of the variable is then generated at an instruction 540 and is stored in the memory 530, to be read out at the corresponding instruction 520' in the audio sample period n+1.

Figure 11:
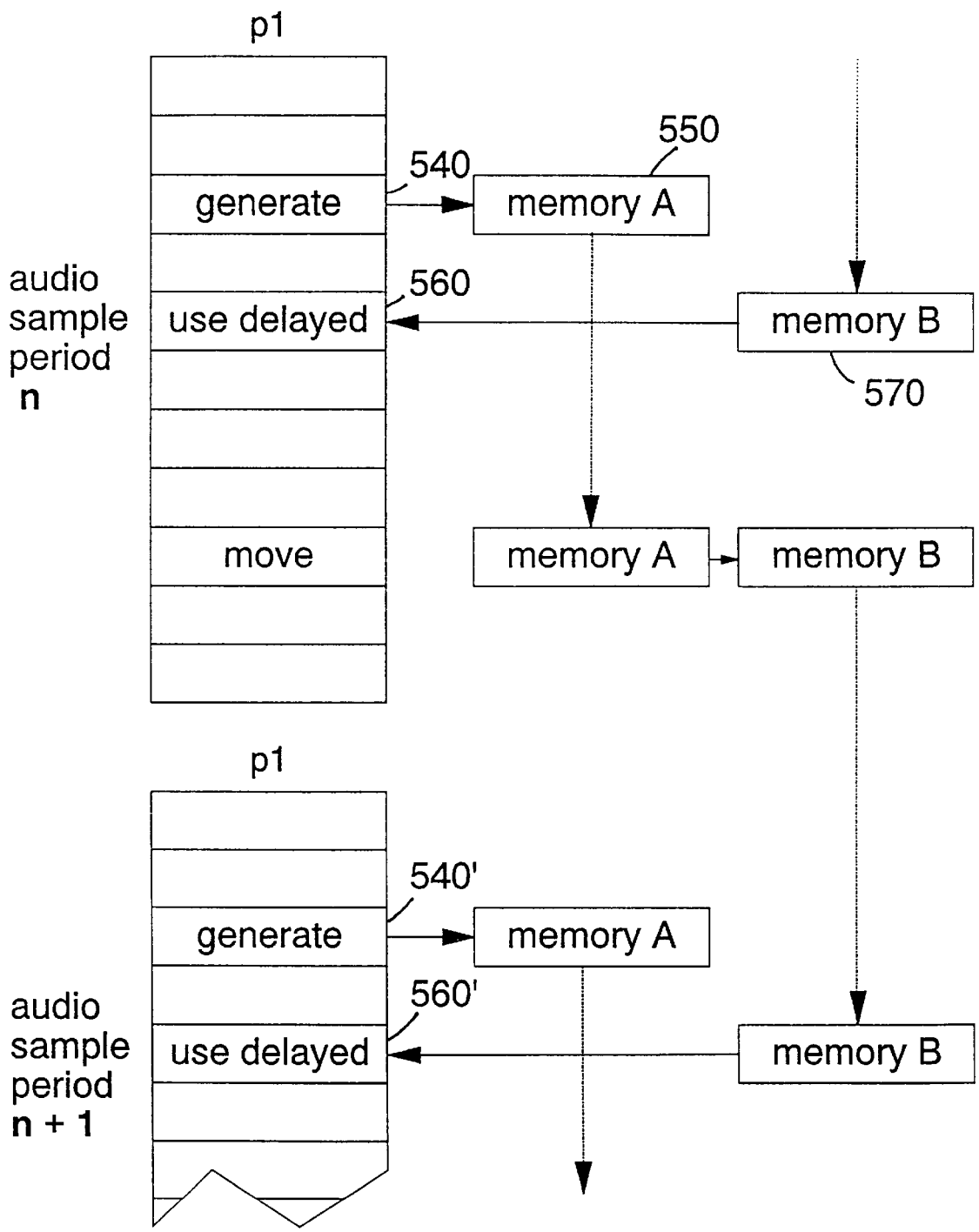
FIG. 11 is a schematic diagram illustrating the problems with previously proposed techniques for handling signal processing using delayed versions of a variable.

In contrast, FIG. 11 is a schematic diagram illustrating how this problem was handled in previously proposed signal processing apparatus.

In FIG. 11, the variable is generated at an instruction 540 and is stored in a first memory 550. The delayed version of the variable is then read at an instruction 560 from a second memory 570. The variable is transferred at an instruction 555 from the first memory to the second memory.

In other words, the previously proposed signal processing apparatus requires twice the memory storage of the present embodiment in which the generation and use of the variable are carried out in the reverse order, and also requires extra instructions 555 to transfer the variable between memories.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of object code generation for a multiple processor data processing apparatus having an array of interconnected processing units, said method comprising the steps of:

(i) generating initial program code comprising successive data processing instructions;

(ii) dividing said initial program code into a plurality of groups of instructions, said number of groups being greater than said number of processing units in said array of processing units;

(iii) detecting said data transfer requirements between pairs of groups of instructions;

(iv) ranking said pairs of groups in decreasing order of said detected data transfer requirements; and (v) joining pairs of groups in the ranking order to form joined groups in the size of each joined group does not exceed a maximum number of instructions executable by each processing unit and so that said joined groups give the greatest reduction in the total data transfer requirement of all of said groups.

2. A method according to claim 1, comprising the further steps of:

(vi) detecting whether said number of joined groups is greater than said number of available processing units, and, if so:

(vi) ranking said joined groups in order to said number of instructions in each joined group; and (vii) joining groups having the highest numbers of instructions with groups having the lowest numbers of instructions to reduce said number of groups to be equal to or less than said number of available processing units.

\* \* \* \* \*